United States Patent [19]

Abraham et al.

[11] Patent Number: 5,510,797
[45] Date of Patent: Apr. 23, 1996

[54] PROVISION OF SPS TIMING SIGNALS

[75] Inventors: Charles Abraham, Cupertino; James M. Janky, Los Altos, both of Calif.

[73] Assignee: Trimble Navigation Limited, Sunnyvale, Calif.

[21] Appl. No.: 47,859

[22] Filed: Apr. 15, 1993

[51] Int. Cl.$^6$ ............ H04L 7/185; G04C 11/02; H04J 3/06; H04C 7/00
[52] U.S. Cl. ............ 342/352; 368/47; 370/104.1; 375/356; 379/63; 455/51.1
[58] Field of Search ............ 342/352, 357; 375/107; 379/63; 370/104.1, 50; 368/47; 455/51.1, 51.2

[56] References Cited

U.S. PATENT DOCUMENTS

| | | | |
|---|---|---|---|
| 4,696,051 | 9/1987 | Breeden | 455/51.1 |
| 5,245,634 | 9/1993 | Averbuch | 375/107 |
| 5,355,529 | 10/1994 | Linquist et al. | 455/51.1 |
| 5,367,524 | 11/1994 | Rideout, Jr. et al. | 370/104.1 |

*Primary Examiner*—Gregory C. Issing
*Attorney, Agent, or Firm*—John Schipper

[57] ABSTRACT

Methods for provision of a sequence of timing signals for one or a plurality of microprocessors, microprocessor peripheral devices or other timing-controlled instruments ("users"), using timing signals determined from a Satellite Positioning System (SPS), such as GPS or GLONASS. In a first embodiment, one or a plurality of users is individually provided with SPS signal antennas and receiver/processors, and timing signals are optionally individually for each user. The timing signals can be periodic, for example, a One-Pulse-Per-Second signal for fine corrections of high frequency timing signals issued by an internal or external clock. The timing signals can also be substantially non-periodic. The timing signals may also be used to determine the time at which selected events occur, such as issuance of interrupt commands in, or directed to, a microprocessor. In another embodiment, CDMA or spread spectrum communications can be implemented and improved by using frequency hopping or other carrier-coded communications in which a time interval for use of the present carrier code is determined by two spaced apart timing signals received from an SPS timing device. In another embodiment, transmission times for each of a plurality of TDMA communications stations are synchronized using SPS timing signals. In another embodiment, each of a plurality of cellular telephone (CT) users is allocated to an appropriate CT cell for signal transmission and receipt, using timing and location information obtained from differential SPS signals.

8 Claims, 3 Drawing Sheets

PROVISION OF SPS TIMING SIGNALS

FIELD OF THE INVENTION

This invention relates to provision of a sequence of Satellite Positioning System timing signals for each of two or more instruments, such as computers or other timing-controlled instruments.

BACKGROUND OF THE INVENTION

Where each of a collection of computers or other instruments is to be controlled or driven by a sequence of timing signals, each such instrument is often left to provide its own timing signals by independent timing means, usually by means of an internal clock. These timing means are often not initially synchronized with each other, and the timing signals produced by any two of these timing means can drift relative to each other with the passage of time.

Some workers have attempted to distribute timing signals for two or more computers or peripherals, using an internal clock or an external clock, which is subject to drift.

U.S. Pat. No. 3,520,128, issued to Novikov et al, discloses an automatic time distribution system. An independent primary clock is connected to, and provides exact time signals for, a plurality of secondary clocks by radio waves. Each secondary clock receives a sequence of uncorrected "exact" time signals and a sequence of timing marks to correct this uncorrected time. The time signals for each secondary clock are apparently corrected separately.

Entner discloses an aircraft navigation system that employs time synchronization provided by satellite-ground communications, in U.S. Pat. No. 3,643,259. A ground-based observation station monitors and predicts the future positions of a single satellite orbiting the Earth and transmits this information to the satellite, which receives and stores this information. The satellite and an aircraft, for which navigation information is to be supplied, have precise on-board clocks, synchronized with each other. The aircraft transmits a first pulse, which is received by the satellite after a time interval $\Delta t1$, and causes the satellite to transmit a second pulse, which is received by the aircraft after a further time interval $\Delta t2$. The total time difference $\Delta t1+\Delta t2$ between transmission of the first pulse and receipt of the second pulse at the aircraft determines the distance travelled by the first pulse. The aircraft generates a first sphere, whose radius is the distance travelled by the satellite signal to the aircraft, and a second sphere, whose center is displaced from the first sphere center by the distance travelled by the aircraft in the time interval of length $\Delta t1$. A third sphere is generated in a manner similar to generation of the first sphere. The (point) intersection of the three spherical surfaces determines the position of the satellite, and the location of the aircraft relative to the satellite is then determined.

Cater, in U.S. Pat. No. 3,811,265, discloses transmission of coded, time-indicating signals from a master clock at a central station to one or more slave clocks, using a two-wire line and binary-valued pulses with different time durations. A time synchronizing pulse is periodically inserted (e.g., once per second) on the line to correct for drift or other errors. If the two-wire line is a standard 60-cycle power line or a television cable, the binary-valued pulses use one or more frequencies that lie outside the frequency range normally used on that line, to avoid signal interference with the standard signals transmitted over that line.

A clock that can be synchronized by "wireless" signals is disclosed by Gerum et al in U.S. Pat. No. 3,881,310. The clock contains an electromagnetically operated mechanical oscillator whose frequency 2f0 is twice the rated frequency of an alternating current network connected to the clock. A time synchronization module transmits a signal of frequency f1>>f0 that is modulated by the network at a frequency f=2f0 and is received and demodulated by the clock. Normally, the pulses received from the network drive the clock, and the oscillator is in a standby mode. The clock oscillator is enabled, and the network is disconnected, when and only when the network frequency differs by at least a predetermined amount from the frequency 2f0 of the oscillator. The oscillator in standby mode receives resonance energy of frequency≈2f0 from the network for maintaining the oscillations.

A TACAN air navigation system is disclosed in U.S. Pat. No. 3,969,616, issued to Mimken. Range of an aircraft from an interrogation signal-transmitting beacon is determined by the lapse in time between transmission of the interrogation signal and receipt of a reply pulse signal from the aircraft (called a "dwell" period in TACAN parlance). A circuit at the beacon generates and uses a filler pulse during any dwell period in which a reply pulse is not received from a target aircraft, in order to maintain a rough and unspecified synchronization at the beacon for the target aircraft when reply pulses are not received. An aircraft velocity detector may be included, with velocity being determined by averaging over several successive dwell periods to reduce the associated velocity error.

Cateora et al, in U.S. Pat. No. 4,014,166, disclose a satellite-controlled digital clock system for maintaining time synchronization. A coded message containing the present time and satellite position is transmitted from a ground station to an orbiting satellite and is relayed to a group of ground-based receivers. A local oscillator aboard the satellite is phase-locked to a precise frequency to provide the system with accurate time-of-year information by a count of the accumulated pulses produced by the oscillator. This count is compared with a time count determined from the coded message received by the satellite. After a selected number of errors are observed through such comparisons, the on-board clock is reset to the time indicated by the coded messages received. If transmission of the coded messages is interrupted, the on-board oscillator continues to provide time information that is transmitted to the ground-based receivers.

An antenna space diversity system for TDMA communication with a satellite is disclosed by U.S. Pat. No. 4,218,654, issued to Ogawa et al. Differences of temporal lengths of paths from the satellite through each antenna to a ground-based signal processor station are determined by measurement of times required for receipt of pre-transmission bursts sent in the respective allocated time slots through two different antennas, in a round trip from base station to satellite to base station. Variable time delays are then inserted in the base station signal processing circuits to compensate for the temporal length differences for the different signal paths. These time delays are changed as the satellite position changes relative to each of the antennas.

U.S. Pat. No. 4,287,597, issued to Paynter et al, discloses receipt of coded time and date signal from two geosynchronous satellites, which signals are then converted into local date and time and displayed. The frequency spectrum is scanned by an antenna to identify and receive the satellite signals. Temporal length differences for signal paths from each satellite through a receiving antenna to a signal processing base station are determined, to provide compensation at the base station for these differences. Time information is provided by a satellite every 0.5 seconds, and this information is corrected every 30 seconds. Signals from either or both satellites are used to provide the time and date information, in normal local time and/or daylight savings local time.

Jueneman discloses an open loop TDMA communications system for spacecraft in U.S. Pat. No. 4,292,683. A spacecraft, such as a satellite, in quasi-geosynchronous orbit carries a transponder that relays a coded signal from a ground-based signal-transmitting station to a plurality of spaced apart, ground-based receivers. This coded signal includes a time index and an index indicating the spacecraft's present position. The time index is adjusted by each receiver to compensate for the changing position of the spacecraft through which the coded signal is relayed. The system is open loop and requires no feedback from the receivers to the base station.

Method and apparatus for determining the elapsed time between an initiating event and some other event are disclosed by U.S. Pat. No. 4,449,830, issued to Bulgier. A first timer and a second time mark the times of occurrence, respectively, of an initiating event and a subsequent event that depends upon occurrence of the initiating event. The two timers are initially connected and synchronized, then disconnected before the initiating event occurs. The timers are then reconnected after both events have occurred, to allow determination of the elapsed time between occurrence of the two events.

Distance ranging and time synchronization between a pair of satellites is disclosed by Schwartz in U.S. Pat. No. 4,494,211. Each satellite transmits a timing signal and receives a timing signal from the other satellite. The difference in time, including compensation for signal processing delay on a satellite, between transmission and receipt of the signals is transmitted by each satellite to the other satellite and is used to establish time synchronization and to determine the distance between the two satellites. This exchange of signals would be repeated at selected time intervals to maintain synchronization, where the satellites are moving relative to each other. No communications link to a third entity is required, and only one of the satellite clocks is adjusted to establish and maintain time synchronization.

Plangger et al, in U.S. Pat. No. 4,582,434, disclose transmission and receipt of a continuously corrected sequence of timing signals. A microprocessor at the receiver periodically compares these timing signals with on-board timing signals generated by a local clock. A varactor diode in a crystal oscillator circuit adjusts the microprocessor's operating frequency to minimize, but not necessarily eliminate, any error between the two timing signal sequences. Delay time for timing signal processing is compensated for in a receiver circuit. The frequency for microprocessor operation is continuously corrected. If the transmitted timing signals are too weak, or do not arrive, the on-board timing signals are used to control the microprocessor until the transmitted timing signals are received in sufficient strength again. This approach uses Greenwich Mean Time, updated approximately once per minute to reduce the timing inaccuracy to a maximum of 0.1 sec.

Noguchi discloses a remote time calibration system using a satellite, in U.S. Pat. No. 4,607,257. A base station provides a reference system of absolute timing signals and transmits these to a satellite that orbits the Earth. The satellite then calibrates and periodically adjusts its internally generated time and transmits observed data plus the corresponding adjusted satellite time to one or more data receiving stations on the Earth that are distinct from the base station. Time calibration optionally compensates for signal propagation time delay from base station to satellite and allows continuous transmission of data from satellite to the data receiving station(s). Several time difference indicia are computed here.

A local area network, having a master timing subsystem and having a plurality of modules, each with a separate timing subsystem, is disclosed by Kirk in U.S. Pat. No. 4,890,222. Each timing subsystem has three timing sequences (fine resolution, synchronization, and present time to the nearest second), each having a different period. Each module timing subsystem can independently provide timing signals for its associated module, or timing signals for all modules can be synchronized by the master timing subsystem. A master timing frame is periodically transmitted by the master timing subsystem to each of the modules; this master timing frame is received and used by each module as its sole timing signal source only if certain conditions are present.

Lusignan, in U.S. Pat. No. 4,972,507, discloses a cellular communications protocol and system in which a plurality of user station respond to transmission command from a base station. The response intervals for each user station are staggered and synchronized so that no overlap occurs between transmissions from different user stations. A unique time delay for each user station is assigned and broadcast by the base station at selected times. However, the base station does not continually provide a sequence of timing signals for synchronization of the user station times inter se.

A time slot allocation method for in a TDMA or similar network is disclosed in U.S. Pat. No. 5,062,035, issued to Tanimoto et al. Time is synchronized, and time slots are allocated and re-allocated, by a master station that communicates directly with each subsidiary station. If the number of reserve or unused time slots of a subsidiary station (1) falls below a first threshold or (2) rises above a second threshold, the master station (1) supplements the time slots of that subsidiary station with one or more of its own time slots or (2) re-allocates to itself one or more time slots from that subsidiary station, respectively. This approach reduces the wait time for signal transmission on the network.

U.S. Pat. No. 5,072,442, issued to Todd, discloses a teleconferencing network in which the stations, operating at different clock rates, can communicate with each other synchronously. A TDMA bus connecting the stations operates at a clock rate equal to the number of stations times the highest clock rate for all the stations, divided by the bit width of the TDMA bus. Buffers are used to receive and hold signals for transmission and/or processing. This approach appears to require redetermination of the bus rate each time the number of network stations changes.

A phase adjustment system for communication between a central station and a plurality of transmitter-receiver pairs is disclosed by Nakahara in U.S. Pat. No. 5,077,759. A target transmitter identification number is transmitted as part of a turn-on signal by the central station, received by the associated receiver, received by the target transmitter from that receiver after a selected time delay, and transmitted to the central station. The central station then adjusts the time delay of each transmitter-receiver pair to achieve a chosen phase relationship of the transmitter-receiver pairs relative to the central station.

Durboraw, in U.S. Pat. No. 5,119,504, discloses use of GPS to assign a mobile, ground-based receiver of GPS signals to a "cell", defined by one or more GPS satellites, on the Earth's surface for communications purposes. The ephemerides for the satellites are stored in the receiver, or in a ground-based system with which the receiver communicates. This patent appears to contemplate two-way communication between a satellite and the receiver provide receiver timing information and to implement receiver hand-offs between cells.

These approaches do not provide a time distribution that is substantially the same for all points on the Earth's surface and do not continually provide corrections to the timing signals issued to and used by the recipient instruments. Further, these approaches are often quite specialized and are therefore difficult to extend to an arbitrary number of instruments or other users. What is needed is a time distribution system that: (1) is usable anywhere on or adjacent to the Earth's surface; (2) is easily extended to any number of time-controlled instruments or other users; (3) continually provides corrections in the timing signals distributed; (4) can provide periodic timing signals and/or special event timing signals on demand; and (5) operates independently of the number of users.

SUMMARY OF THE INVENTION

These needs are met by the invention, which provides several embodiments for distribution of time, as determined and corrected by a Satellite Positioning System (SPS), such as GPS or GLONASS, to one or a plurality of computers or other time-controlled instruments ("users"). In a first embodiment, one or a plurality of users is individually provided with SPS signal antennas and receiver/processors, and timing corrections occur individually for each user. The timing signals may be periodic, for example, a One-Pulse-Per-Second signal for fine corrections of high frequency timing signals issued by an internal or external clock, or may be non-periodic. These timing signals may also be used as interrupt commands, received by a computer to reset or correct its internal clock. These timing signals may also be used to determine the time at which selected events occur, such as issuance of interrupt commands by an internal interrupt device (e.g., a CPU) or by an internal interrupt device (e.g., a keyboard, pen/tablet or other data entry device) in a microprocessor.

In another embodiment, one master user (or less than all users) in a network of users can be provided with SPS timing signals that are then distributed, with appropriate signal propagation delay compensation, to all other network users. All network user clocks are then synchronized to the SPS timing signals for either (1) inter-user communication or (2) cooperative action by the users.

In another embodiment, spread spectrum communications can be implemented and improved by using CDMA communications, or by using frequency hopping in which a time interval for use of a specified carrier frequency is determined by two consecutive time points specified in the communications hardware or software. Timing signals received from an SPS timing device are used to determine when the carder frequency is to be changed. The time intervals for each carrier frequency can be of constant length or can be specified arbitrarily by the communications hardware or software.

In another embodiment, signal transmission times for each of a plurality of TDMA communications stations are allocated and synchronized, using SPS timing signals to provide a single timing signal sequence for all stations.

In another embodiment, each of a plurality of cellular telephone (CT) users is allocated to an appropriate CT cell for signal transmission and receipt, using timing and location information obtained from differential positioning, using SPS signals received at a CT cell master station.

DETAILED DESCRIPTION OF THE INVENTION

Figure 1:
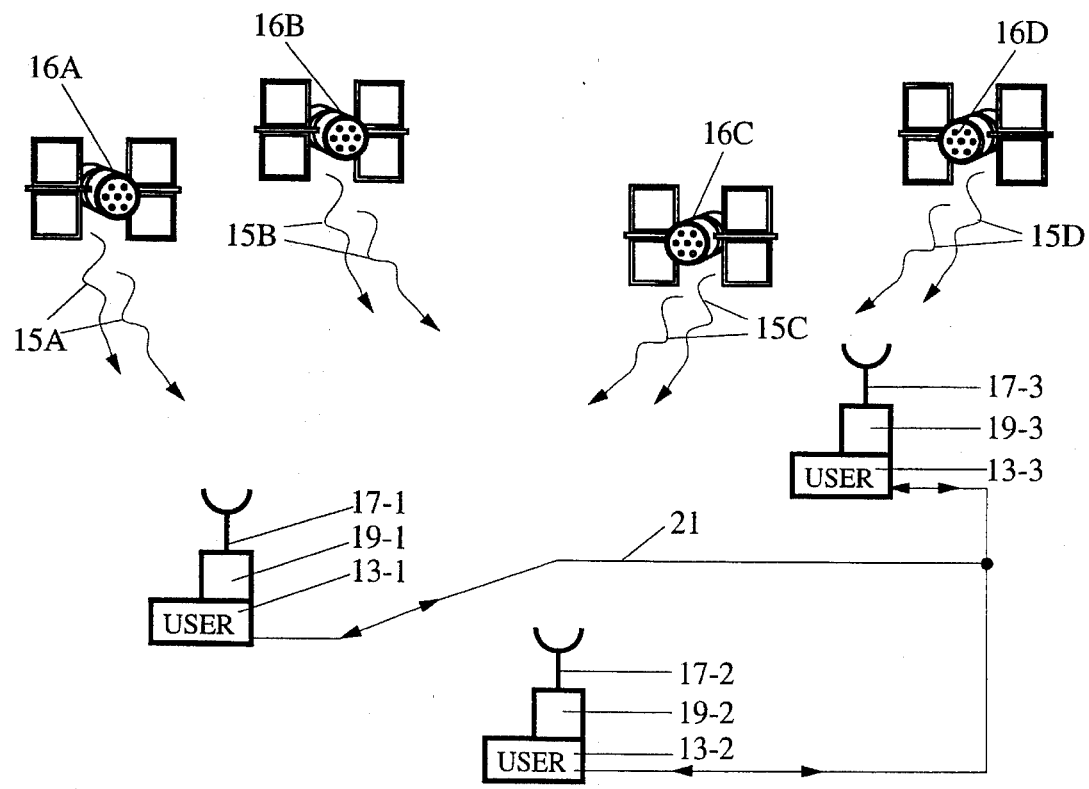
FIG. 1 is a schematic view of provision of accurate time according to an embodiment of the invention.

FIG. 1 illustrates one embodiment 11 of the invention, in which one or more microprocessors or other time-controlled instruments 13-i (i=1, 2, ... ), referred to herein as "users" for convenience, each receive Satellite Positioning System (SPS) signals 15A, 15B, 15C, 15D, etc. from one or more SPS satellites 16A, 16B, 16C, 16D, etc., respectively. Each user 13-i has an SPS signal antenna 17-i and associated SPS signal receiver/processor 19-i that is connected to, or replaces, a user clock. Each user 13-i receives the SPS-determined time from the associated receiver/processor 19-i and either (1) uses this time directly for timing signals that control operation of the user (microprocessor or other timing-controlled instrument), or (2) uses this time to adjust the timing signals issued by the user clock. In the second alternative here, the SPS-determined time can provide a periodic and recognizable sequence of pulses with period T (e.g., one pulse per second) that is used to adjust the user clock timing signal each time such a pulse is received by the user 13-i.

In a second embodiment, also illustrated in FIG. 1, two or more users 13-1, 13-2, 13-3, etc. form a network of users that are connected by a bidirectional signal transmission channel 21, which may be a coaxial or other cable, a wire, an over-the-air channel, or any other suitable channel for transmission of electromagnetic signals between two spaced apart users. Each user 13-i receives the SPS-determined time, with suitable SPS satellite corrections from time to time, and occasionally transmits and receives timing messages to the other users on the network, to determine a representative time delay for propagation $\Delta t_d(i,j)$ of a transmitted signal to the user 13-i from another user 13-j ($j \neq i$). The signal propagation time delays $\Delta t_d(i,j)$ and $\Delta t_d(j,i)$ may be used by the user 13-i to determine (1) when to expect an acknowledgment signal from a message sent from user 13-i to user 13-j; and (2) when to expect user 13-j to react to a command or information signal sent by user 13-i to user 13-j. Alternatively, the user 13-i may time stamp a signal sent to the user 13-j so that the recipient knows whether the information contained in the received signal is current or "stale".

In a third embodiment, also illustrated in FIG. 1, one user, say 13-1, is designated as a master station and retains its SPS antenna 17-1 and SPS receiver/processor 19-1, and the SPS antennas 17-k and SPS receiver/processors 19-k (k≧2) are deleted. The users 13-i are again formed into a network, and the master station 13-1 provides each other user 13-k (k≧2) with the present SPS-determined time by use of the transmission channel 21. Here again, each user 13-k (k≧2) will determine through testing the signal propagation time delay $\Delta t_d(1,k)$ for a signal sent from the master station 13-1 to user 13-k and will add this time delay to the SPS-determined time received from the master station 13-1. Here, the synchronized times for the users can be utilized (1) for communication between the users and/or (2) for cooperative action to be taken by two or more users in the network. Alternatively, each user in the network can receive the SPS signals and can determine the (common) network time from these signals.

The second and third embodiments illustrated in FIG. 1 can also be used to implement a time division multiple access (TDMA) communications network, wherein each network user is assigned one or more non-overlapping time intervals during which that user can transmit signals or information; no station contention should occur in a TDMA system. The SPS-determined time, or timing signals, made available at each user 13-i in FIG. 1 can be used to determine when the user 13-i can transmit on the network. Because each user is constantly aware of the present (and common) SPS time, no special time synchronization preamble need be used in a frame or packet transmitted by that user. In practice, it may still be preferable to provide some time synchronization means for an incoming frame or packet.

Figure 2:
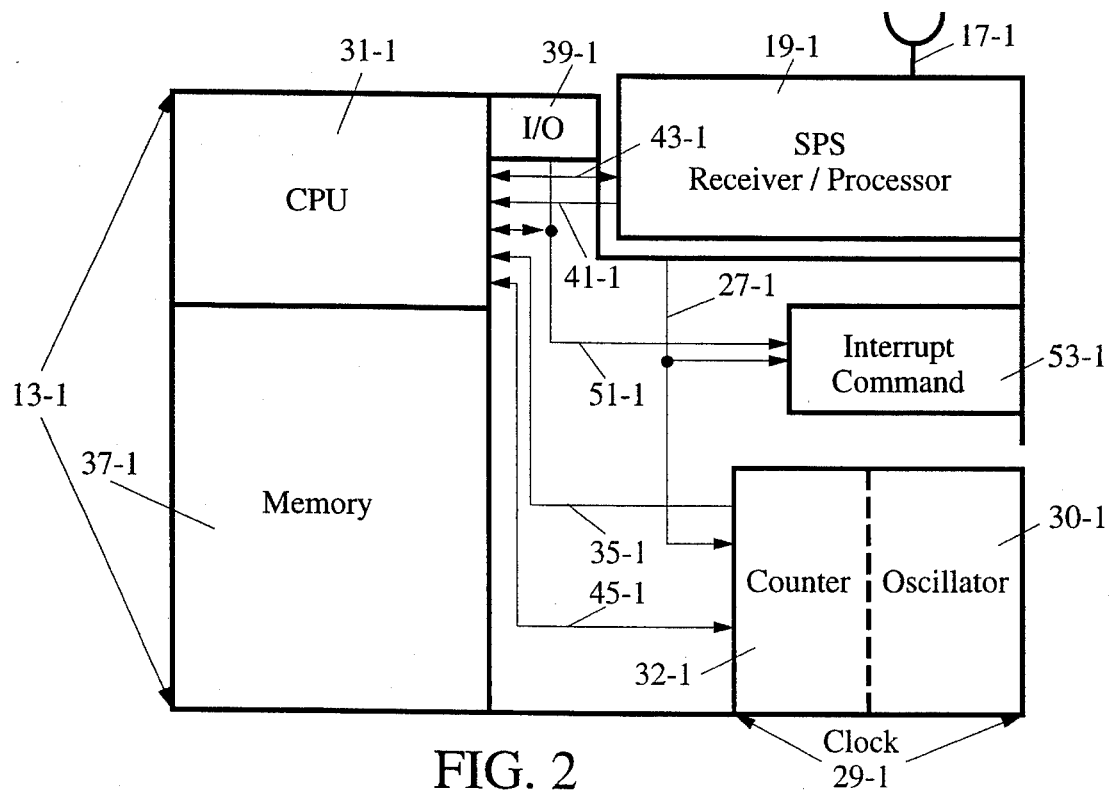
FIG. 2 is a schematic view of microprocessor apparatus configured to practice the embodiment illustrated in FIG. 1, and other embodiments.

FIG. 2 is a schematic view of user apparatus 13-1 (here, a computer or microprocessor), an SPS antenna 17-1 and an SPS receiver/processor 19-1 suitable for practice of the embodiment of the invention illustrated in FIG. 1. SPS signals received by the SPS receiver/processor 19-1 are analyzed or used directly to provide SPS-determined timing signals that are issued on a first bus or link 27-1 and received by an internal clock module 29-1 (optional) that includes an oscillator 30-1 and a counter 31-1. The SPS timing signals may be used to supplant, to adjust, or to fine tone the internal clock timing signals, and the resulting timing signals are passed along a unidirectional second bus or link 35-1 to the CPU 31-1, for timing control thereof. The microprocessor 13-1 optionally includes a memory module 37-1 and an input/output (I/O) module 39-1.

FIG. 2 also illustrates user apparatus 13-1 suitable for practice of a second embodiment of the invention, wherein the CPU 31-1 receives a sequence of periodic or non-periodic SPS timing signals directly from the SPS receiver/processor 19-1 on a unidirectional bus or link 41-1. Each time the CPU 31-1 receives an SPS timing signal, the CPU interrogates the SPS receiver/processor 19-1 on a bidirectional bus or link 43-1 and receives a return signal indicating the SPS time corresponding to this SPS timing signal. This SPS time is used by the CPU 31-1 to periodically correct or fine tune the times or timing signals received received by the CPU from the internal clock 29-1 on a bidirectional third bus or link 45-1. Alternatively, the unidirectional bus 41-1 can be deleted, and all timing signals, time information, and requests therefor can be transmitted over the bidirectional bus 43-1, with appropriate signal indicia included with each signal. Alternatively, the SPS receiver/processor 19-1 can also provide the SPS-determined date, as well as time, for the CPU 31-1 on the bidirectional bus 43-1.

FIG. 2 also illustrates user apparatus 13-1 suitable for practice of a third embodiment of the invention. In this embodiment, availability of the SPS-determined time allows determination and, optionally, storage of the (global) times at which the CPU 31-1 receives and acts upon interrupt commands that are externally or internally generated. Externally generated interrupt commands may be generated by the I/O module 39-1, which may include a keyboard, a pen/tablet, or other I/O device (not shown) for data or instruction entry. The interrupt command is received on a first bus or link 51-1 by an interrupt command module 53-1, which also receives the SPS timing signals on a second bus or link 27-1 from the SPS receiver/processor 19-1. Internally generated interrupt commands may be generated by the CPU 31-1, for example, where a diagnostic subroutine indicates that the microprocessor needs to take some corrective action. Occurrence of an interrupt command generated by the CPU 31-1 could be communicated to the interrupt command module 53-1 over the first bus or link 51-1. The time and nature of each interrupt command received by the CPU can be stored in the microprocessor memory 37-1 for subsequent analysis, if desired.

Although FIG. 2 uses a microprocessor or computer to show suitable user apparatus 13-1 for practicing the embodiment of the invention illustrated in FIG. 1, the user illustrated in FIG. 1 can be any apparatus that is controlled by a timing device and requires a precise timing sequence for its operation.

Figure 3:
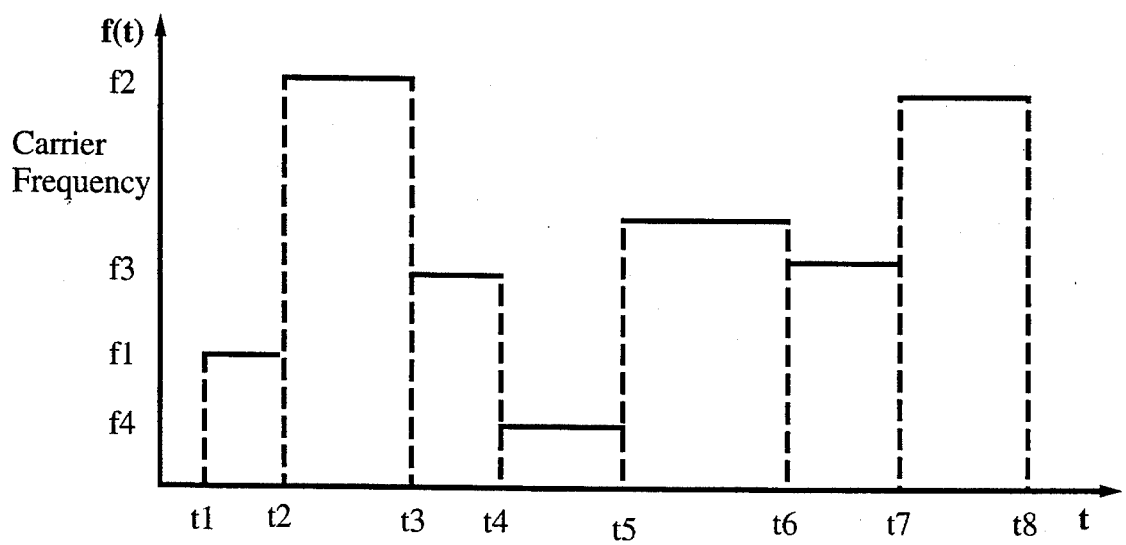
FIG. 3 is a graphical view of frequency hopping that may be practiced according to another embodiment of the invention.

Another use of the invention is to coordinate frequency hop intervals for spread spectrum communications between a transmitter and a receiver, spaced apart. FIG. 3 illustrates graphically a typical pattern of carrier frequency f as a function of time t, as implemented in a spread spectrum frequency hop communication system. The carder frequency f=f(t) has a value f=$f_n$ in the time interval $T_n$={t|$t_n$≦t<$t_{n+1}$} for n=1, 2, ..., and a given carrier frequency value $f_n$ may be, but need not be, repeated. The carrier frequency f=$f_n$ and the corresponding time interval $T_n$ can be specified by hardware or software that is part of the communications system. According to one embodiment of the invention, the transmitter and the receiver would each be provided with an SPS antenna and associated SPS receiver/processor, as was indicated in FIG. 1. A selected carrier frequency pattern, such is shown in FIG. 3, is provided for the transmitter and for the receiver so that, when the transmitter carrier frequency changes from f=$f_n$ to f=$f_{n+1}$, the receiver will follow this change without difficulty because (1) the receiver has the identical carrier frequency pattern stored in an associated memory or in hardware and (2) the receiver has access to the same SPS-determined time as the transmitter to determine the times t=$t_n$ at which the carrier frequency transitions occur. Optionally, the spread spectrum signal receiver may introduce a fixed time delay in the beginning time $t_n$ of a time interval $T_n$, to compensate for signal propagation delay time from the transmitter to the receiver.

Figure 4:
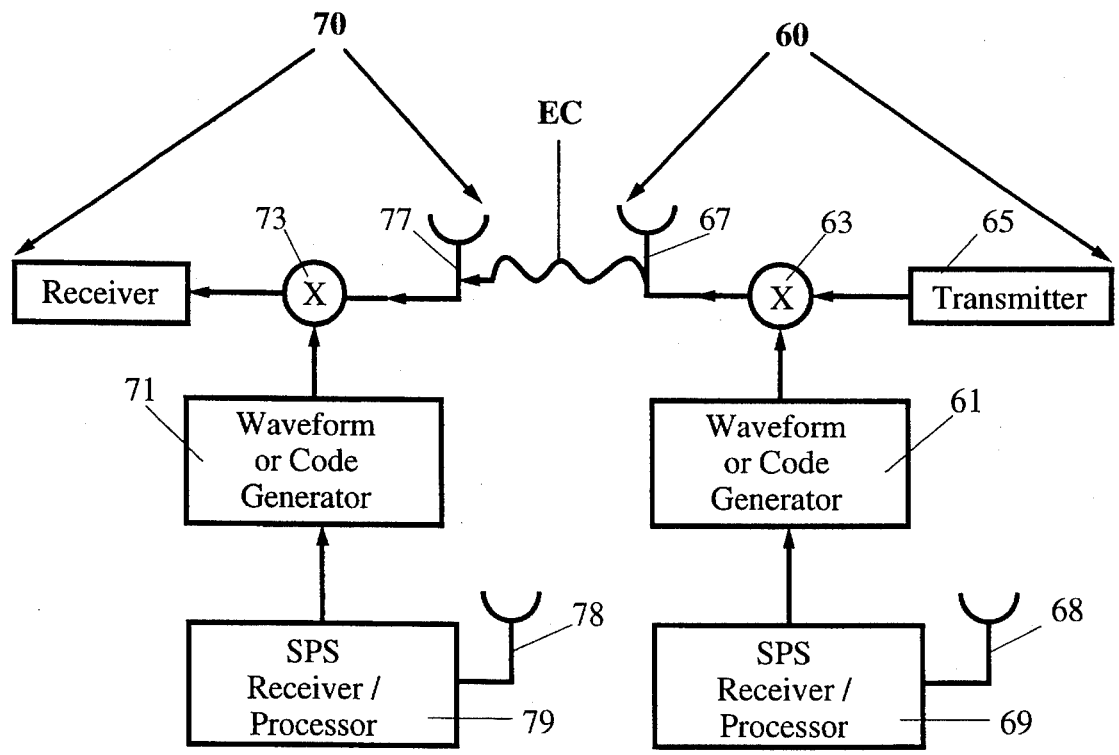
FIG. 4 is a schematic view of CDMA communications apparatus constructed and operated according to the invention.

More generally, code division multiple access (CDMA) communications can be implemented according to the invention, as illustrated in FIG. 4. A first waveform or code generator 61 contains a communication waveform or code $C_{I,n}$ to be used by a first station 60 to transmit signals during a time interval $T_n$ (n=1, 2, ...). During the time interval $T_n$, the code generator 61 provides a copy of the code $C_{I,n}$ at one input terminal of a signal mixer 63. A transmitter 65 at the station 60 provides a signal to be transmitted by this station during the time interval $T_n$ at a second input terminal of the first mixer 63. An encoded signal EC produced by the first mixer and transmitted at an antenna 67 for the station 60.

A second station 70 receives the encoded signal EC at an antenna 77 and passes this signal to a first input terminal of a mixer 73. A second input terminal of the mixer 73 receives a communication waveform or code $C_{l,n}$ produced by a second waveform or code generator 71 for the time interval $T_n$, optionally compensated for propagation time delay of the encoded signal EC from the antenna 67 to the antenna 77. Output of the mixer 73 is received by a receiver at the second station 70.

The first waveform or code generator 61 is provided with an SPS antenna 68 and SPS receiver/processor 69 to receive SPS signals and to determine the present SPS time at the first station 60. This present SPS time is made available to the first waveform or code generator 61 so that the time intervals $T_n$ can be accurately identified. In a similar manner, the present SPS time is made available for the second waveform or code generator 71, by providing an SPS antenna 78 and SPS receiver/processor 79 to determine the SPS time from SPS signals received at this antenna. Alternatively, the present SPS time can be made available for the two waveform or code generators 61 and 71 by a single SPS antenna and associated SPS receiver/processor.

Figure 5:
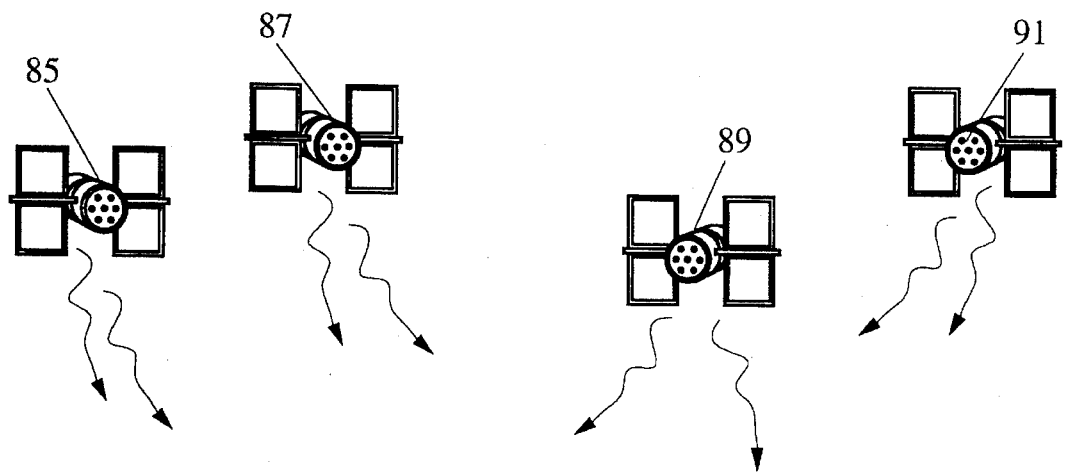
FIG. 5 is a schematic view illustrating use of the invention for determination of subscriber hand-off between cellular telephone cells according to another embodiment.
Figure 5:
Figure 5:
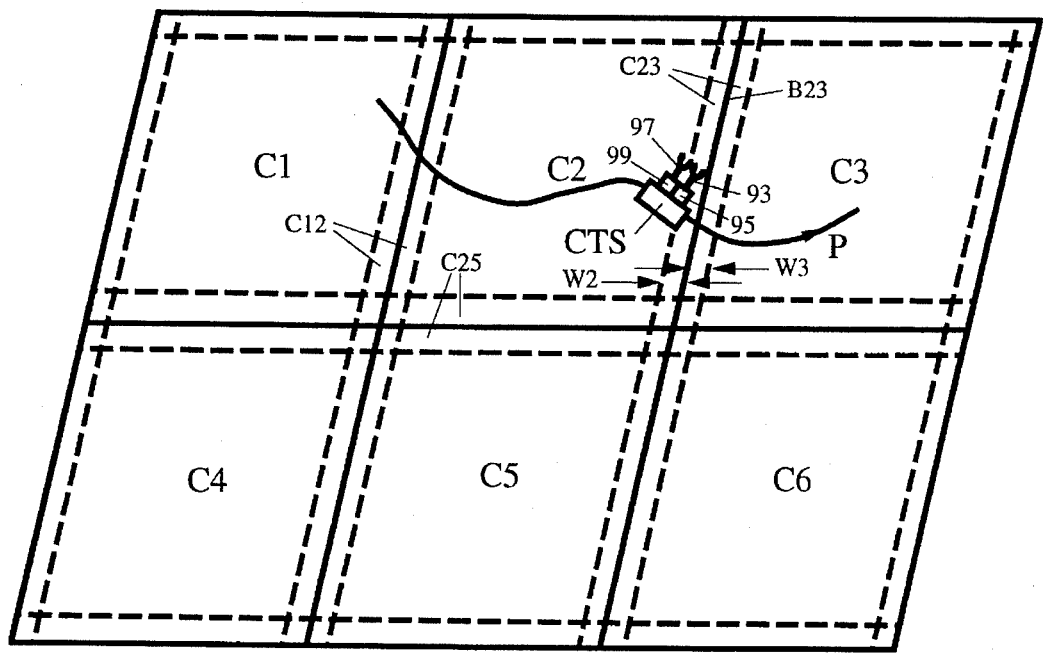

Another use of the invention is to coordinate hand-off of a cellular telephone subscriber, CTS, from a first cell to an adjacent second cell when the subscriber crosses a boundary between the two cells. FIG. 5, which shows a plurality of adjacent cells C1–C6, illustrates operation of the invention in this mode. ACTS moves along a path P that passes from a first cell C2 to an adjacent second cell C3. Although a "true" boundary B23 may be drawn between the adjacent cells C2 and C3, it is more convenient to deliniate a boundary region C23, which surrounds and includes the "true" boundary line B23 and a small portion of each of the cells C2 and C3 that is adjacent to the boundary line B23, of non-zero width, as shown in FIG. 5. This produces a small amount of hysteresis at a boundary crossing and allows the CTS to travel along, or adjacent to, the boundary line B23 without requiting continual switching between the two cells C2 and C3.

As the CTS moves along the path P in FIG. 5, the CTS passes into the region C23 from the remainder of the cell C2, and this action alerts the operator(s), OCT-1 and OCT-2, of the cellular telephone system that this CTS may soon need to be handed off from cell C2 to cell C3. Each cellular telephone system operator OCT-i is connected to an SPS antenna 81-i and SPS receiver/processor 83-i (i=1,2, ... ) that receives SPS signals from a plurality of SPS satellites 85, 87, 89 and 91. These SPS signals are used to determine the SPS-determined position and time of the operator OCT-i, and this position is compared with the known site position (which may be, but need not be, fixed) of this operator. A system operator OCT-i can thus provide differential SPS correction, if desired, for other entities within the cells C1–C6 that receive and process the SPS signals.

Each CTS carries an SPS antenna 93, SPS receiver/processor 95, antenna 97 and transmitter (or transceiver) 99 and can continuously or intermittently transmit its present location within the cells C1–C6, as determined by the SPS signals. This transmitted SPS-determined location of the CTS is received by the operator(s) OCT-1 and/or OCT-2 of the system, and the system can estimate an approximate time and/or position at which the CTS will pass from the region C23 (still associated with the cell C2) into the remainder of cell C3, where the CTS is now allocated to cell C3. Based upon this estimate, the two cells C2 and C3 can coordinate the hand-off of responsibility for saving the CTS near their common boundary B23, at a time determined or estimated by the SPS signal information.

Where high accuracy is required for allocation of a CTS to a particular cell in FIG. 5, the present location of the CTS is determined by the system operator OCT-i (i=1 and/or 2) using SPS differential positioning techniques, as discussed by Allison in U.S. Pat. No. 5,148,179, or by Hatch in U.S. Pat. Nos. 4,812,991 and 4,963,889, which are all incorporated by reference herein. These techniques form differences of SPS signals received by two SPS antenna and receiver/processor systems that are near to one another. Formation of these signal differences causes errors that are common or have similar amplitudes to cancel out. The inaccuracy of the resulting SPS-determined location of a roving receiver, such as a CTS, is then reduced from tens of meters to less than one meter.

With the system position inaccuracy PI reduced to one meter or less here, differential positioning using SPS is suitable for determination of the present location of a CTS for purposes of cell hand-off in regions where the cells are relatively small, such as high density urban areas. With reference to FIG. 5, the minimum width of the boundary region C23 in cell 2 and in cell 3 is assumed to be w2 (>0) and w3 (>0), respectively. If a representative position inaccuracy PI in the combined cells 2 and 3 is known, the cell 2 and cell 3 boundary region widths can be reduced to w2>PI and w3>PI, because any SPS-determined CTS position shown within cell 2 (or within cell 3) that is not in the boundary region C23 will, with high probability, not lie in cell 3 (or in cell 2). As noted above, provision of a boundary region, such as C23, surrounding the boundary line B23 between two adjacent regions is also useful to suppress the tendency of cell allocation to vacillate rapidly when the CTS moves along the boundary line B23 between these two regions.

Timing signals from the SPS for any of the above-discussed embodiments of the invention are available every 1 µsec, or more often under some circumstances. Additional periodic timing signals are available at other intervals, such as one second. If an event of interest occurs, or is scheduled to occur, at a particular time $t=t_0$, the nearest SPS timing signal may differ from the time $t_0$ by an amount $\Delta t(quantiz)$ due to quantization error, where $\Delta t(quantiz)$ has a maximum magnitude of 1 µsec and an average magnitude of 0.5 µsec. The SPS timing system also manifests a small amount of jitter, with an average jitter interval $\Delta t(jitter) \approx 100$ nsec. The average timing signal inaccuracy arising from these two sources of error, 600 nsec, is thus less than 1 µsec. If the event whose time of occurrence is to be captured is specified in milliseconds, this average timing inaccuracy is relatively small and can be ignored.

A Satellite Positioning System (SPS) is a system of satellite signal transmitters, with receivers located on the Earth's surface or adjacent to the Earth's surface, that transmits information from which an observer's present location and/or the time of observation can be determined. Two operational systems, each of which qualifies as an SPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1500 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay$\propto f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision A, 26 Sep. 1984, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, N.Y., 1992, incorporated by reference herein.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of $8/17$ of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k (=0, 1, 2, ..., 23) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SPS. A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Under some circumstances, differential positioning can provide location coordinates and distances that are accurate to within a few centimeters.

In differential position determination, many of the errors in the SPS that compromise the accuracy of absolute position determination are similar in magnitude for stations that are physically close. The effect of these errors on the accuracy of differential position determination is therefore substantially reduced by a process of partial error cancellation.

We claim:

1. A method for providing a sequence of timing signals for a network of M microprocessors or other timing-controlled electronic instruments, numbered m=1, 2, ..., M, (M≧2), the method comprising the steps of:

providing a network containing a plurality of M timing-controlled electronic instruments, numbered m=1, 2, ..., M (M≧2);

providing each of the M electronic instruments with an internal clock that generates and issues internal tinning signals for use in operations by that instrument;

providing a GPS signal antenna and GPS signal receiver/ processor, to receive and process GPS signals from two or more GPS satellites, to use these GPS signals to determine the times of receipt of these signals at the GPS antenna, to continually compute and transmit a sequence of time measurement signals, which have associated timing errors of at most about one microsecond and which are transmitted at least once in every time interval of length at most about one second; and causing each of the M instruments to receive this sequence of time measurement signals from the GPS receiver/processor and to adjust its internal timing signals to be synchronized with this sequence of time measurement signals, whereby the timing of operations performed by each of the M instruments is synchronized with the sequence of timing signals.

2. The method of claim 1, wherein said step of adjusting said internal timing signals for said instrument number m comprises:

determining the time interval $\Delta t(rcvr,m)$ presently required for signal propagation from said GPS receiver/ processor to said instrument m ($m=1, 2, \ldots, M$) at each of a selected sequence of times; and compensating for this value of the time interval $\Delta t(rcvr,m)$ in adjusting said internal timing signals for said instrument number m.

3. The method of claim 1, further comprising the steps of:

transmitting at least one message, containing information other than a time measurement signal, from a first instrument numbered m1 to a second instrument numbered m2, where m1 and m2 are distinct numbers ($m1 \neq m2$) drawn from the numbers $m=1, 2, \ldots, M$; and attaching to this message a time stamp indicating the time, determined by the instrument number m 1, that this message is transmitted from the instrument number m1 to the instrument number m2.

4. A method for synchronizing communications between two or more users in a code division multiple access (CDMA) communications system, the method comprising the steps of:

providing a plurality of M electronic communications means, numbered $m=1, 2, \ldots, M$ ($M \geq 2$), for transmitting electromagnetic signals to, and receiving electromagnetic signals from, each other, where each communications means has an internal clock that generates and issues internal timing signals for use by that communications means, and where, if communications means number m transmits one or more signals during a selected time interval $T_{m,n}=\{t | t_{m,n} \leq t < t_{m,n+1}$ ($n=1, \ldots, N; N \geq 1$)\}, communications means number m uses a selected transmission code $C_{m,n}$ for encoding this transmission during the time interval $T_{m,n}$;

for two distinct numbers m1 and m2 ($m1 \neq m2$), drawn from the set of numbers $m=1, 2, \ldots, M$, providing communications means number m1 with a transmission code $C_{m1,n1}$ for a first selected sequence of time intervals $T_{m1,n1}$ and with a transmission code $C_{m2,n2}$ for a second selected sequence of time intervals $T_{m2,n2}$, where n1 and n2 are drawn from the set of numbers $n=1, \ldots, N$;

providing a GPS signal antenna and GPS signal receiver/ processor, to receive and process GPS signals from two or more GPS satellites, to use these GPS signals to determine the times of receipt of these signals at the GPS antenna, to continually compute and transmit a sequence of time measurement signals, which have associated timing errors of at most about one microsecond and which are transmitted at least once in every time interval of length at most about one second, to provide this sequence of time measurement signals for communications means numbers m1 and m2;

causing each of the instruments number m1 and m2 to receive this sequence of time measurement signals from the GPS receiver/processor and to adjust its internal timing signals to be synchronized with this sequence of time measurement signals, causing the communications means number m1 to generate and issue the following sequences:

a first sequence of one or more pairs of timing signals at times $t=t_{m1,m1}$ and $t=t_{m1,n1+1}$, corresponding to the beginning time and the ending time of the selected time intervals $T_{m1,n1}$; and a second sequence of one or more pairs of timing signals at times $t=t_{m2,n2}$ and $t=_{m2,n2+1}$, corresponding to the beginning time and the ending time of the selected time intervals $T_{m2,n2}$;

causing the communications means number m1 to transmit a signal that is encoded using the communication code $C_{m1,n1}$ during at least one of the selected time intervals $T_{m1,n1}$; and causing the communications means number m1 to receive a signal transmitted by communication means number m2 during at least one of the selected time intervals $T_{m2,n2}$ and to use the transmission code $C_{m2,n2}$ to decode this received signal.

5. The method of claim 4, further comprising the steps of:

transmitting at least one message, containing information other than a time measurement signal, from said instrument numbered m1 to said instrument numbered m2; and attaching to this message a time stamp indicating the time, determined by said instrument number m1, that this message is transmitted from said instrument number m1 to said instrument number m2.

6. A method for communicating information from a first location to a second location by means of spread spectrum communications, the method comprising the steps of:

providing an electronic communications means transmitter at a first location that transmits, at least once per second, an arbitrary signal using any of a selected set of carrier frequencies $\{f_n\}_n$ ($n=1, 2, \ldots, N; N \geq 2$), with at least two carrier frequencies $f_n$ being distinct from each other;

providing an electronic communications means receiver at a second location, spaced apart from the first location, that is capable of receiving and interpreting an arbitrary signal using any of the selected set of frequencies $\{f_n\}_n$;

providing each of the transmitter and the receiver with a sequence of time measurement signals from a GPS signal receiver/processor, which time measurement signals have associated timing errors that are at most about one microsecond and which are received at least once in every time interval of length at most about one second, at a selected set of times $\{t_n\}_n$, where $t_n < t_{n+1}$ ($n=1, 2, \ldots, N-1$);

causing the electronic communications means transmitter to transmit a message and the electronic communications means receiver to receive this message, where the transmitter uses the carrier frequency $f_n$ during the time interval given by $t_n < t < t_{n+1}$, and uses at least two distinct carrier frequencies;;

transmitting at least one message, containing information other than a time measurement signal, from said transmitter to said receiver; and attaching to this message a time stamp indicating the time, determined by the transmitter, that this message is transmitted from the transmitter to the receiver.

7. A method for synchronizing communications between a plurality of users in a time division multiple access (TDMA) communications system, the method comprising the steps of:

providing a plurality of M electronic communications means, numbered m=1, 2, ..., M (M≥2) for transmitting signals to, and receiving signals from, each other, where each communications means has an internal clock that generates and issues internal timing signals for use by that communications means;

providing each communications means number m (1≤m≤M) with a sequence of one or more selected time intervals $T_{m,n} = \{t | t_{m,n} \leq t < t_{m,n+1}$ (n= 1, ..., N-1; N≥2)\}, during which communications means number m may transmit signals, where any two time intervals $T_{m1,n1}$ and $T_{m2,n2}$ have no overlapping time values if m1≠m2, or n1≠n2, or both m1≠m2 and n1≠n2 (m1 and m2=1, 2, ..., M; n1 and n2=1, ..., N);

providing a GPS signal antenna and GPS signal receiver/processor to receive and process GPS signals from a plurality of two or more GPS satellites, and to use these GPS signals to continually compute and transmit a sequence of time measurement signals, which have associated timing errors that are at most about one microsecond and which are transmitted at least once in every time interval of length at most about one second;

causing each of communications means number m (m=1, 2, ..., M) to receive the sequence of time measurement signals issued by the GPS receiver/processor and to synchronize the internal clock of communications means number m to these timing signals; and causing at least one of the communications means number m to transmit a signal during at least one of the time intervals for which $t_{m,n} \leq t < t_{m,n+1}$ (n=1, ..., N).

8. The method of claim 7, further comprising the steps of:

transmitting at least one message, containing information other than a time measurement signal, from said instrument numbered m1 to said instrument numbered m2; and attaching to this message a time stamp indicating the time, determined by said instrument number m1, that this message is transmitted from said instrument number m1 to said instrument number m2.

* * * * *